US009981626B2

(12) United States Patent
Maeda et al.

(10) Patent No.: US 9,981,626 B2
(45) Date of Patent: May 29, 2018

(54) VEHICLE BODY EQUIPPED WITH AIRBAG SYSTEM

(71) Applicant: HONDA MOTOR CO., LTD., Tokyo (JP)

(72) Inventors: Kento Maeda, Wako (JP); Yuji Ishizuka, Wako (JP); Taro Shimizu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/236,994

(22) Filed: Aug. 15, 2016

(65) Prior Publication Data

US 2017/0050604 A1    Feb. 23, 2017

(30) Foreign Application Priority Data

Aug. 21, 2015   (JP) ................................ 2015-164228

(51) Int. Cl.
 B60R 21/213   (2011.01)
 B60R 21/232   (2011.01)

(52) U.S. Cl.
 CPC .......... *B60R 21/213* (2013.01); *B60R 21/232* (2013.01)

(58) Field of Classification Search
 CPC combination set(s) only.
 See application file for complete search history.

(56) References Cited

U.S. PATENT DOCUMENTS

| 7,735,857 B2 * | 6/2010 | Hidaka | B60R 21/213 |
| | | | 280/728.2 |
| 9,266,491 B1 * | 2/2016 | Gillay | B60R 21/213 |
| 2009/0160165 A1 * | 6/2009 | Torii | B60R 13/025 |
| | | | 280/730.2 |
| 2011/0115199 A1 * | 5/2011 | Shimazaki | B60R 21/213 |
| | | | 280/728.2 |
| 2012/0319383 A1 * | 12/2012 | Sugiyama | B60R 21/213 |
| | | | 280/728.2 |
| 2014/0110922 A1 * | 4/2014 | Uchida | B60R 21/214 |
| | | | 280/730.2 |

(Continued)

FOREIGN PATENT DOCUMENTS

| JP | 2008-168781 A | 7/2008 |
| JP | 2009-056873 A | 3/2009 |

(Continued)

OTHER PUBLICATIONS

Office Action dated Jan. 10, 2017, issued in counterpart Japanese Patent Application No. 2015-164228. (3 pages).

*Primary Examiner* — Nicole T Verley
(74) *Attorney, Agent, or Firm* — Westerman, Hattori, Daniels & Adrian, LLP

(57) ABSTRACT

A vehicle body 10 equipped with an airbag system has a side curtain airbag 20 provided on a roof side rail 12. The side curtain airbag 20 includes: a bag body 51 that is disposed along the roof side rail 12; a central protector 59 that holds the bag body 51; and an inflator 52 that is configured to feed gas to the bag body 51. The central protector 59 has a contact end part 65 that is opposed to a reinforcement member 48 with a gap L2 left therebetween. The contact end part 65 is moved toward the reinforcement member 48 by a deployment force of the bag body 51, and the contact end part 65 is thus supported by the reinforcement member 48.

5 Claims, 8 Drawing Sheets

(56) References Cited

U.S. PATENT DOCUMENTS

2016/0375853 A1\* 12/2016 Desai ................... B60R 21/213
                                                                                  280/728.2

FOREIGN PATENT DOCUMENTS

| JP | 2010-162940 A | 7/2010 |
| JP | 2011-218994 A | 11/2011 |
| WO | WO2012/011343 A1 | 1/2012 |

\* cited by examiner

VEHICLE BODY EQUIPPED WITH AIRBAG SYSTEM

CROSS-REFERENCE OF RELATED APPLICATION

This application claims priority of Japanese Patent Application No. 2015-164228 filed in Japan on Aug. 21, 2015, the entire contents of which are incorporated herein by reference.

TECHNICAL FIELD

The present invention relates to a vehicle body equipped with an airbag system in which a bag body of a side curtain airbag is mounted on a side part of the vehicle body such as a roof side rail.

BACKGROUND OF THE INVENTION

In some vehicle bodies equipped with an airbag system, a bracket is attached to a roof side rail, a claw of a protector is movably inserted in an engagement hole of the bracket, and a bag body is supported by the protector. Mien the bag body deploys, the claw of the protector is butted against the engagement hole by a deployment force of the bag body, whereby deformation of the protector can be prevented (see Japanese Patent Application Publication No, 2008-168781, for example).

However, in the vehicle body equipped with an airbag system according to Japanese Patent Application Publication No. 2008-168781, the claw of the protector is movably inserted in the engagement hole. Due to this, the claw of the protector moves and interferes with the engagement hole while the vehicle is running, and therefore unusual noise might be generated by the interference between the engagement hole and the claw.

Besides, some of protectors as in Japanese Patent Application Publication No. 2008-168781 are fixed on (united with) brackets. Thereby, when the bag body deploys, deformation of the protector due to the deployment force of the bag body is suppressed by the bracket.

Meanwhile, since the protector is united with the bracket, the shapes of the bracket and the protector become complicated. For this reason, it is difficult to position the protector at a predetermined position and deploy the bag body smoothly. Thus, there is still room for improvement in terms of this point of view.

Further, in some vehicle bodies equipped with an airbag system, a bracket is attached to a roof side rail, a claw part of a protector is in contact with the bracket, and a bag body is supported by the protector. Since the claw part of the protector is in contact with the bracket, a deployment force of the bag body at the time of deployment of the bag body can be supported by the bracket and thus deformation of the protector can be prevented (see Japanese Patent Application Publication No. 2010-162940, for example).

Here, in order to support the deployment force of the bag body with the bracket, it is required that the claw part of the protector be kept in contact with the bracket to support the bag body stably.

In the meantime, it is conceivable in the protector of Japanese Patent Application Publication No. 2010-162940 that the claw part of the protector might come off from the bracket due to manufacturing tolerance and assembly tolerance. ID this case, while a vehicle is running, the claw part of the protector moves and interferes with the bracket, so that unusual noise might be generated due to the interference between the bracket and the claw part (that is, protector).

A challenge of the present invention is to provide a vehicle body equipped with an airbag system capable of preventing generation of unusual noise, deploying a bag body smoothly, and holding the bag body stably.

SUMMARY OF INVENTION

A first embodiment of the present invention provides a vehicle body equipped with an airbag system that is provided with an airbag system in a side part of the vehicle body, characterized in that the airbag system includes: a bag body that is disposed along the side part of the vehicle body; a protector that holds the bag body; and an inflator that is configured to feed gas to the bag body and deploys the bag body with the gas thus fed, the protector has an end part that is disposed on an inner side in a vehicle widthwise direction and opposed to the vehicle body with a gap left therebetween, and the protector is deformed by a deployment force of the bag body and thus the end part is moved toward the vehicle body and supported by the vehicle body.

In this way, the end part of the protector is disposed on the inner side in the vehicle widthwise direction and opposed to the vehicle body with the gap left therebetween. That is to say, it is possible to separate the end part of the protector from the vehicle body in a favorable way even if manufacturing tolerance and assembly tolerance are taken into account.

Thereby, it is possible to prevent the end part of the protector from moving and interfering with the vehicle body while the vehicle is running, and thus possible to prevent generation of unusual noise due to the interference between the end part of the protector and the vehicle body.

Further, the protector is deformed by the deployment force of the bag body and thus the end part of the protector is supported by the vehicle body. Accordingly, an impact force generated when the bag body deploys can be supported by the vehicle body. This makes it possible to support the protector at a predetermined position in a stable manner, and thus to deploy the bag body smoothly and hold the bag body stably with the protector.

According to a second embodiment of the present invention, it is preferable that the vehicle body includes: a side panel that is included in the side part; and an upper panel that is provided above the end part, and the protector is mounted on the side panel, and the end part is supported by the upper panel when the bag body deploys.

In this way, the protector is mounted on the side panel, and a front part of the protector is supported by the upper panel. Accordingly, when the bag body deploys, the protector can be supported at multiple points (specifically two points), i.e., the side panel and the upper panel. Thereby, it is possible to support the bag body with the protector when the bag body deploys and thus to improve the stability of the bag body.

According to a third embodiment of the present invention, it is preferable that the protector includes: the end part; a receiving part that is provided outside the end part in the vehicle widthwise direction and designed to receive the bag body when deployed; and a curve part that is formed between the receiving part and the end part and connects the receiving part and the end part to each other.

In this way, the curve part is formed between the receiving part and the end part, and the curve part connects the receiving part and the end part to each other. This enables the end part of the protector to be placed close to the outer side in the vehicle widthwise direction, Thereby, the width dimension of the protector in the vehicle widthwise direction can be made small, so that a large space can be secured inside the vehicle.

According to a fourth embodiment of the present invention, it is preferable that the vehicle body includes a body component that is provided inside the airbag system in the vehicle widthwise direction, and the body component includes a mounting part that is disposed inside the airbag system in the vehicle widthwise direction so as to be adjacent to the airbag system with a clearance therebetween and that is fastened to the vehicle body with a fastening member.

Here, by connecting the receiving part and the end part with the curve part, the width dimension of the protector in the vehicle widthwise direction is made small. This enables the vehicle body to include the body component inside the airbag system in the vehicle widthwise direction, enables the mounting part of the body component to be disposed inside the airbag system in the vehicle widthwise direction with a clearance therebetween and enables the mounting part to be fastened to the vehicle body with the fastening member.

In this way, since the width dimension of the protector in the vehicle widthwise direction is made small, it is possible to prevent the body component from being covered with the protector from the inside of the vehicle. Thereby, a space for mounting the body component can be secured inside the airbag system in the vehicle widthwise direction after the process of mounting the airbag system.

According to the above embodiments of the present invention, it is possible to prevent unusual noise from being generated while a vehicle is running due to interference of a protector with a vehicle body. In addition, by supporting the protector at a predetermined position in a stable manner, a bag body can deploy smoothly, and the bag body can be held by the protector stably.

DETAILED DESCRIPTION OF THE INVENTION

A best mode for carrying out the present invention is described below on the basis of the attached drawings. Note that the terms "front (Fr)", "rear (Rr)", "left (L)", and "right (R)" are defined based on directions viewed from a driver.

EMBODIMENTS

A vehicle body 10 equipped with an airbag system according to the embodiment is described. The vehicle body 10 equipped with an airbag system is hereinafter abbreviated as the "vehicle body 10".

Figure 1:
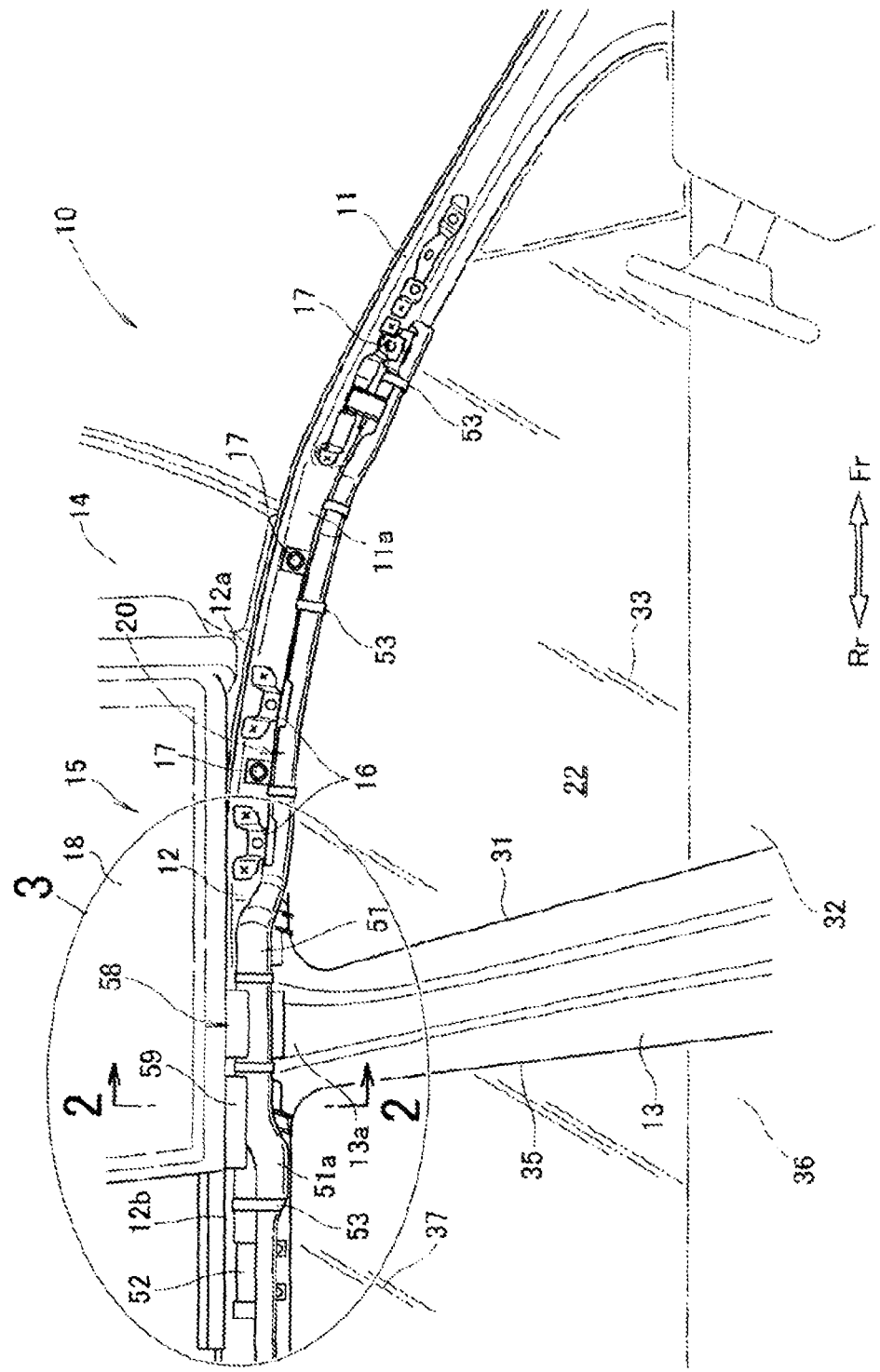
FIG. 1 is a perspective view illustrating a vehicle body equipped with an airbag system according to the present invention as viewed from below inside the vehicle.

As illustrated in FIG. 1, the vehicle body 10 includes: a front pillar 11 that is provided on its outer side in a vehicle widthwise direction; a roof side rail 12 (a side part of the vehicle body 10) that extends toward the rear of the vehicle body from a rear end part 11a of the front pillar 11; a center pillar 13 that supports the roof side rail 12; a roof 14 that is provided on the roof side rail 12; a sunroof unit (a body component) 15 that is provided in the roof 14; and a side curtain airbag (an airbag system) 20 that is mounted along the front pillar 11 and the roof side rail 12.

The front pillar 11, a front part 12a of the roof side rail 12, the center pillar 13, and the like together form a front opening 31. A front side door 32 is openably and closably supported by the front opening 31. In a state where the front side door 32 is closed, a window glass 33 of the front side door 32 is disposed along the front opening 31.

A rear part 12b of the roof side rail 12, the center pillar 13, and the like together form a rear opening 35. A rear side door 36 is openably and closably supported by the rear opening 35. In a state where the rear side door 36 is closed, a window glass 37 of the rear side door 36 is disposed along the rear opening 35.

Figure 2:
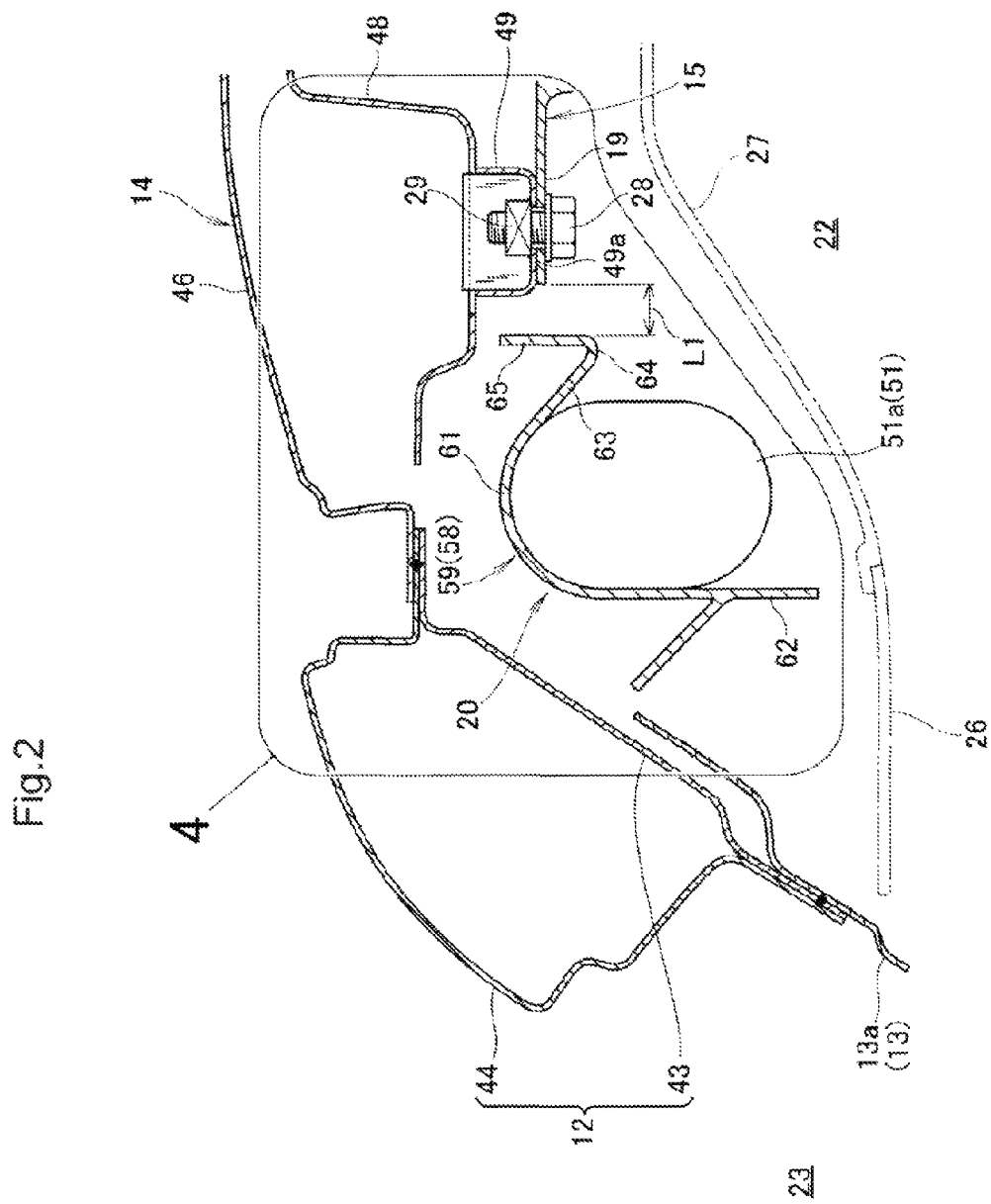
FIG. 2 is a sectional view taken along the line 2-2 in FIG. 1.

As illustrated in FIG. 2, the roof side rail 12 includes: an inner panel (a side panel) 43 that is provided on a vehicle interior 22 side; and an outer panel 44 that is provided on a vehicle exterior 23 side.

A pair of brackets 16 (see FIG. 1) is attached to the roof side rail 12, and a grab rail (handhold) is attached to the pair of brackets 16.

In addition, the roof 14 includes: a roof panel 46 that is provided on the vehicle exterior 23 side; a roof member 47 (see FIG. 5) that is provided on the roof panel 46 from the vehicle interior 22 side and extends in the vehicle widthwise direction; a reinforcement member (an upper panel) 48 that is provided on the roof panel 46 from the vehicle interior 22 side; and a mounting bracket 49 that is attached to the reinforcement member 48.

The roof side rail 12, the side curtain airbag 20, and the roof 14 are covered with a rail garnish 26 and a roof garnish 27 from the vehicle interior 22 side.

The roof panel 46 is reinforced with the roof member 47 and the reinforcement member 48. Further, the mounting bracket 49 is attached to the reinforcement member 48. The sunroof unit 15 (see also FIG. 1) is mounted on a bottom part 49a of the mounting bracket 49.

The sunroof unit 15 is provided inside the side curtain airbag 20 in the vehicle widthwise direction. Specifically, the sunroof unit 15 includes a mounting part 19 at the outer side of a unit body 18 (see FIG. 1) in the vehicle widthwise direction. The mounting part 19 is disposed inside the side curtain airbag 20 in the vehicle widthwise direction so as to be adjacent to the side curtain airbag 20 with a clearance L1 therebetween.

The mounting part 19 is fastened to the reinforcement member 48 of the vehicle body 10 with a bolt 28 and a nut 29 (a fastening member). Thereby, the sunroof unit 15 is mounted on the reinforcement member 48 (i.e., the roof 14). The reinforcement member 48 is provided above a contact end part 65 of a protector 58 to be described later.

In a state where the sunroof unit 15 is mounted on the roof 14, the roof 14 is opened and closed in the unit body 18 (see FIG. 1).

Figure 3:
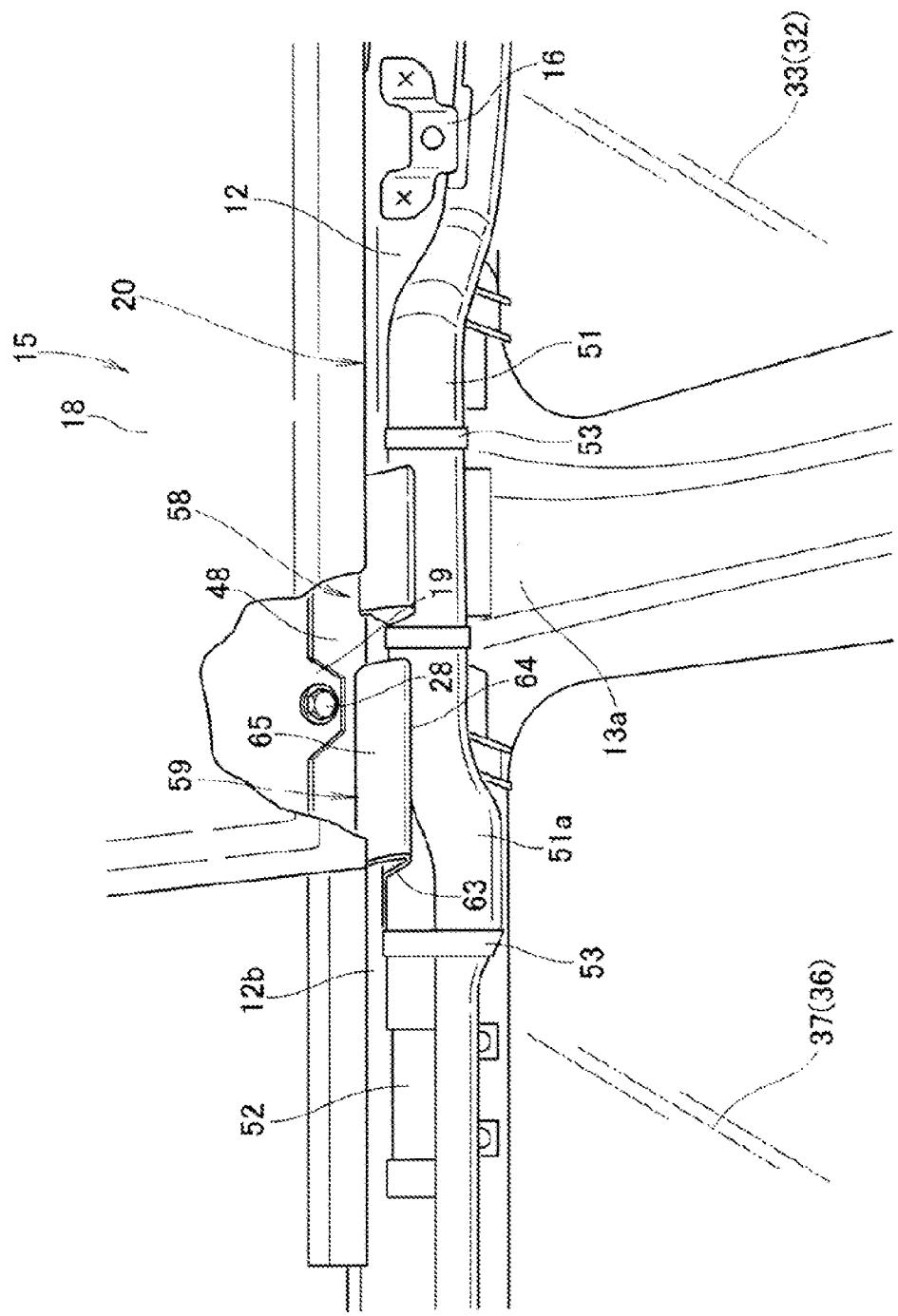
FIG. 3 is an enlarged view of a part 3 in FIG. 1.

As illustrated in FIG. 3, the side curtain airbag 20 includes: a bag body 51 that is disposed along the front pillar 11 (see FIG. 1) and the roof side rail 12 in a folded state; the protector 58 that holds the bag body 51; and an inflator 52 that is configured to feed gas to the bag body 51.

In the folded state, the bag body 51 is bundled into a long shape, and is mounted on the protector 58 with multiple straps 53. In this state, a central part 51a of the bag body 51 is connected to the inflator 52.

The side curtain airbag 20 is mounted on the front pillar 11 (see FIG. 1) and the roof side rail 12 with multiple bolts 17 (see FIG. 1), multiple nuts, and the like.

By feeding gas from the inflator 52 to the bag body 51, the bag body 51 inflates from the folded state. The bag body 51 having inflated deploys downward along the window glass 33 of the front side door 32 and the window glass 37 of the rear side door 36.

The inflator 52 is provided in the rear part 12b of the roof side rail 12 at a position near an upper end part 13a of the center pillar 13.

Figure 4:
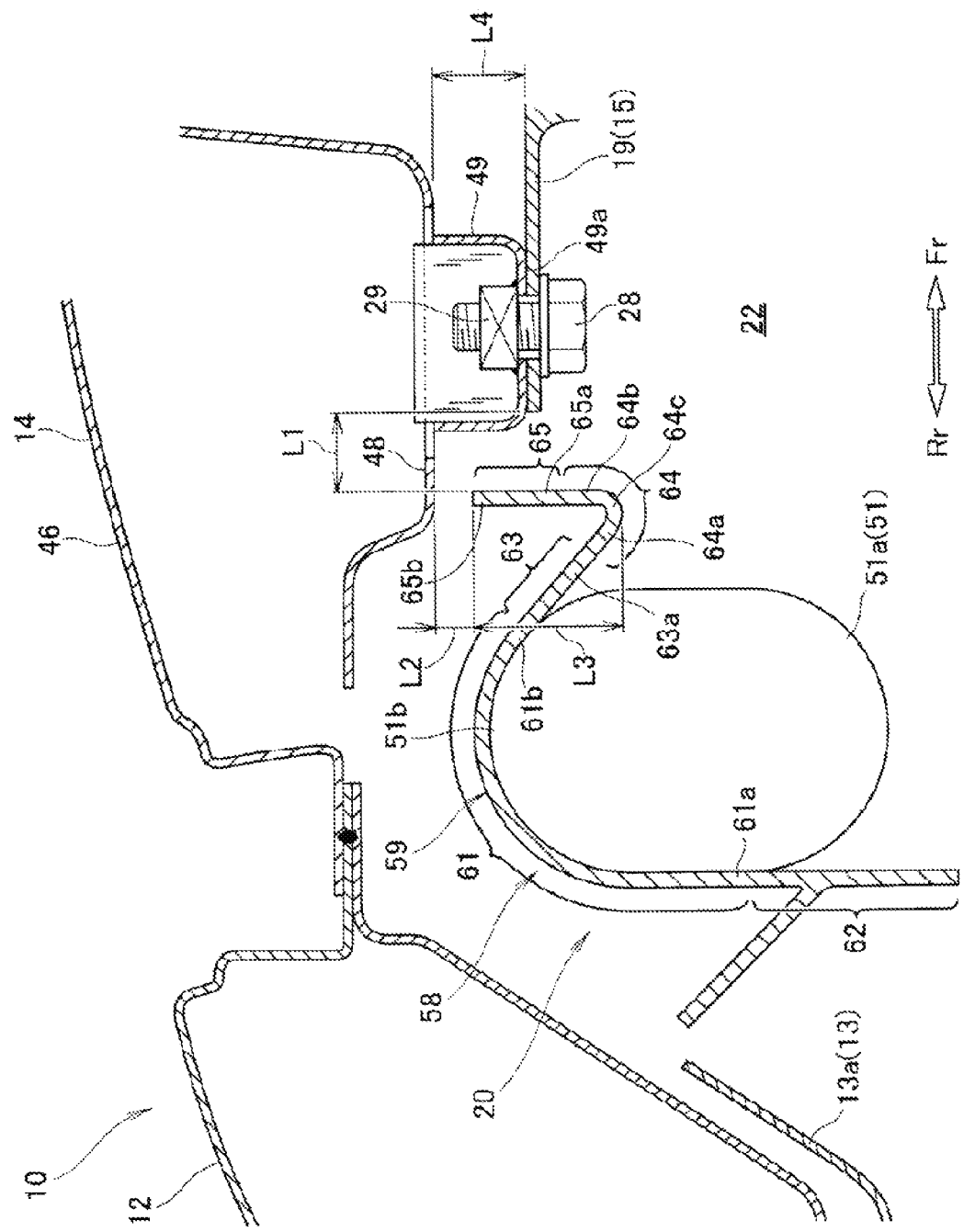
FIG. 4 is an enlarged view of a part 4 in FIG. 2.
Figure 5:
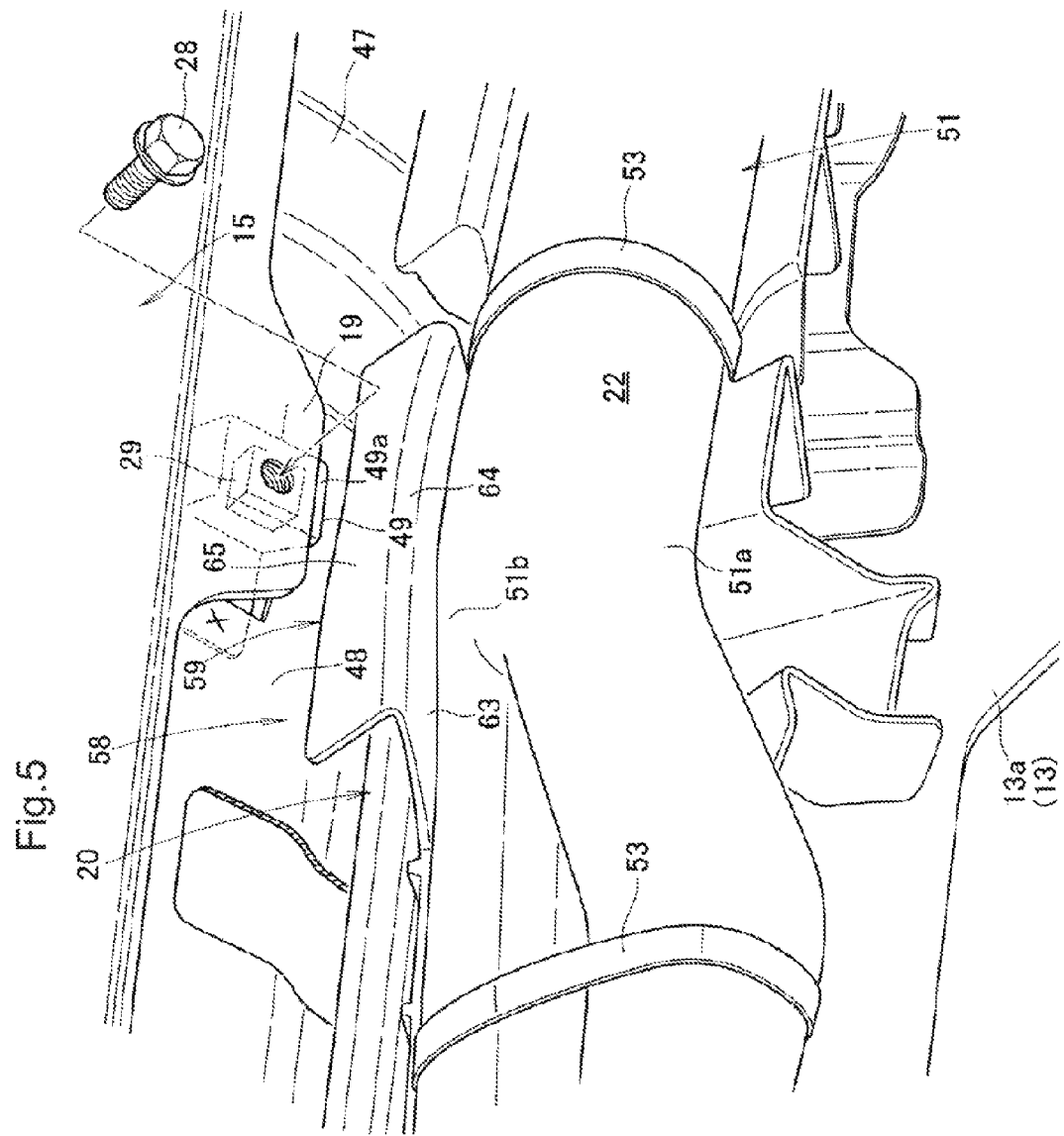
FIG. 5 is a perspective view illustrating the relation between a central protector and a sunroof unit of FIG. 3.

As illustrated in FIGS. 4 and 5, the protector 58 is an elastically deformable member and has a central protector 59 that is located on the upper end part 13a of the center pillar 13.

The central protector 59 has: a support part 61 that supports an upper half part 51b of the central part 51a of the bag body 51; a lower part 62 that extends downward linearly from an outer end 61a of the support part 61; a receiving part 63 that extends inward in the vehicle widthwise direction along a descending slope from an inner end 61b of the support part 61; a curve part 64 that is connected to a lower end 63a of the receiving part 63; and the contact end part (end part) 65 that extends upward from an inner end of the curve part 64.

The support part 61 is a portion that supports the upper half part 51b of the central part 51a of the bag body 51 when the bag body 51 is in the folded state. The support part 61 and the lower part 62 are fastened to the inner panel 43 of the roof side rail 12 with a bolt and a nut (i.e., a fastening member).

The receiving part 63 is a portion that is provided outside the contact end part 65 in the vehicle widthwise direction and designed to receive the central part 51a of the deployed bag body 51.

The curve part 64 is a portion that is formed between the receiving part 63 and the contact end part 65 and designed to connect the receiving part 63 and the contact end part 65 to each other. Specifically, the curve part 64 has an outer end part 64a communicating with the lower end 63a of the receiving part 63 and an inner end part 64b communicating with a lower end 65a of the contact end part 65. The curve part 64 is formed substantially in a V-shape by the outer end part 64a and the inner end part 64b.

The contact end part 65 is located inside the curve part 64 in the vehicle widthwise direction and below the reinforcement member 48 of the vehicle body 10, and is disposed to be opposed to the reinforcement, member 48 with a gap L2 left therebetween. In other words, the central protector 59 has the gap L2 secured between the contact end part 65 and the reinforcement member 48 in consideration of manufacturing tolerance and assembly tolerance.

Accordingly, it is possible to prevent the contact end part 65 of the central protector 59 from interfering with the reinforcement member 48 due to vertical movement of the contact end part while the vehicle is running, and thereby possible to prevent generation of unusual noise due to the interference between the contact end part 65 and the reinforcement member 48.

Here, a distance L3 from an upper end 65b of the contact end part 65 to a bottom part 64c of the curve part 64 is larger than a distance L4 from the reinforcement member 48 to the mounting part 19 of the sunroof unit 15. Hence, in a state where the upper end 65b of the contact end part 65 is in contact with the reinforcement member 48, the bottom part 64c of the curve part 64 is located below the mounting part 19 (see FIG. 4).

The reason why the bottom part 64c of the curve part 64 is disposed below the mounting part 19 will be described in detail using FIG. 7.

In addition, the curve part 64 is formed substantially in a V-shape, and the receiving part 63 and the contact end part 65 are connected to each other by the curve part 64. Accordingly, the contact end part 65 is placed close to the outer side in the vehicle widthwise direction, which makes small the width dimension of the central protector 59 in the vehicle widthwise direction.

Thereby, a large space can be secured in the vehicle interior 22, which enables the sunroof unit 15 to be placed inside the side curtain airbag 20 in the vehicle widthwise direction.

To put it differently, since the width dimension of the central protector 59 in the vehicle widthwise direction is made small, it is possible to prevent the sunroof unit 15 from being covered with the central protector 59 from the vehicle interior 22 side.

This enables the sunroof unit 15 to be mounted after the process of mounting the side curtain airbag 20.

Figure 6:
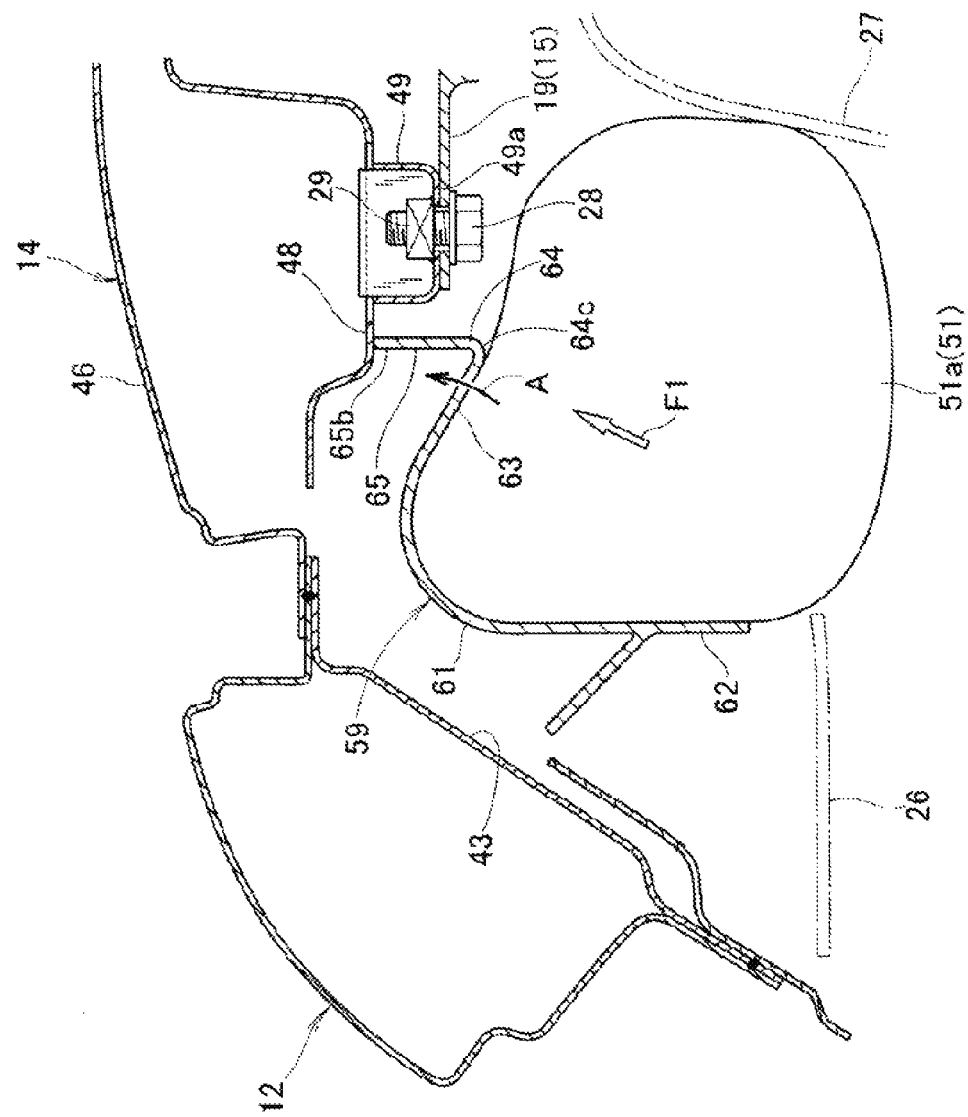
FIG. 6 is a sectional view illustrating a bag body of FIG. 2 in a deployed state.

As illustrated in FIG. 6, along with the deployment of the bag body 51, the central part 51a of the bag body 51 comes into contact with the receiving part 63 of the central protector 59. A deployment force F1 of the bag body 51 acts on the receiving part 63, and the central protector 59 (especially the receiving part 63) is deformed upward by the deployment force F1 as indicated by the arrow A.

By the upward deformation of the receiving part 63, the contact end part 65 is moved upward toward the reinforcement member 48. The upper end 65b of the contact end part 65 comes into contact with the reinforcement member 48, and the contact end part 65 is thus supported by the reinforcement member 48.

Here, the support part 61 and the lower part 62 are fastened to the inner panel 43 of the roof side rail 12 with the bolt and nut (i.e., the fastening member). Thus, since the contact end part 65 is supported by the reinforcement member 48, the central protector 59 can be stably supported at multiple points (specifically two points), i.e., the inner panel 43 and the reinforcement member 48 when the bag body 51 deploys.

Thus, the bag body 51 during deployment can be supported favorably by the central protector 59, whereby the stability of the bag body 51 can be improved.

Figure 7:
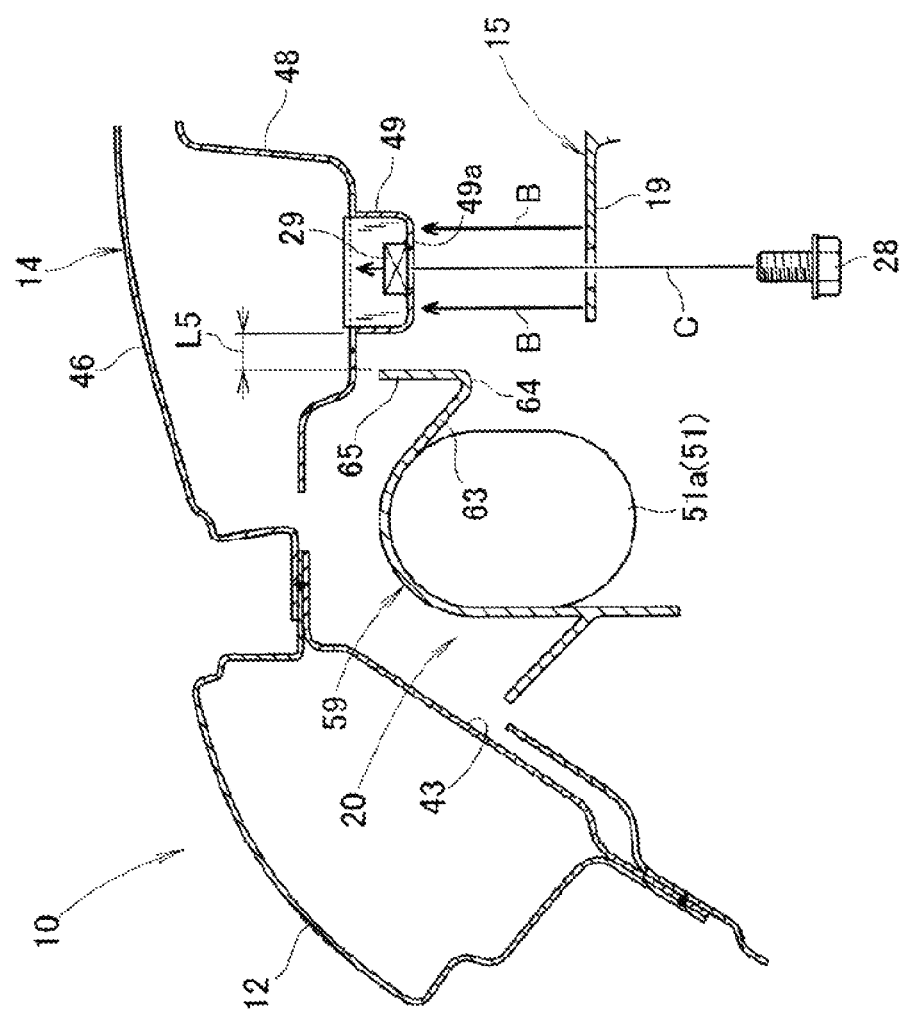
FIG. 7 is a view for explaining an example of mounting the sunroof unit on a reinforcement member of the vehicle body according to the present invention.

Next, based on FIG. 7, a description is given of an example of mounting the sunroof unit 15 on the reinforcement member 48.

As illustrated in FIG. 7, the receiving part 63 and the contact end part 65 of the central protector 59 are connected to each other by the curve part 64, which makes small the width dimension of the central protector 59 in the vehicle widthwise direction. Thus, the contact end part 65 of the central protector 59 is disposed outside the mounting bracket 49 in the vehicle widthwise direction by a distance L5. The mounting part 19 of the sunroof unit 15 is disposed inside the mounting bracket 49 in the vehicle widthwise direction.

Accordingly, after the process of mounting the side curtain airbag 20 to the inner panel 43 of the roof side rail 12, the mounting part 19 of the sunroof unit 15 can be disposed on the bottom part 49a of the mounting bracket 49 as indicated by the arrow B and, in the state where the mounting part 19 is disposed on the mounting bracket 49, the bolt 28 can be fastened to the nut 29 through the mounting part 19 and the mounting bracket. 49 as indicated by the arrow C.

Thereby, the sunroof unit 15 can be mounted on the reinforcement member 48 (that is, the vehicle body 10) via the mounting bracket 49.

Figure 8:
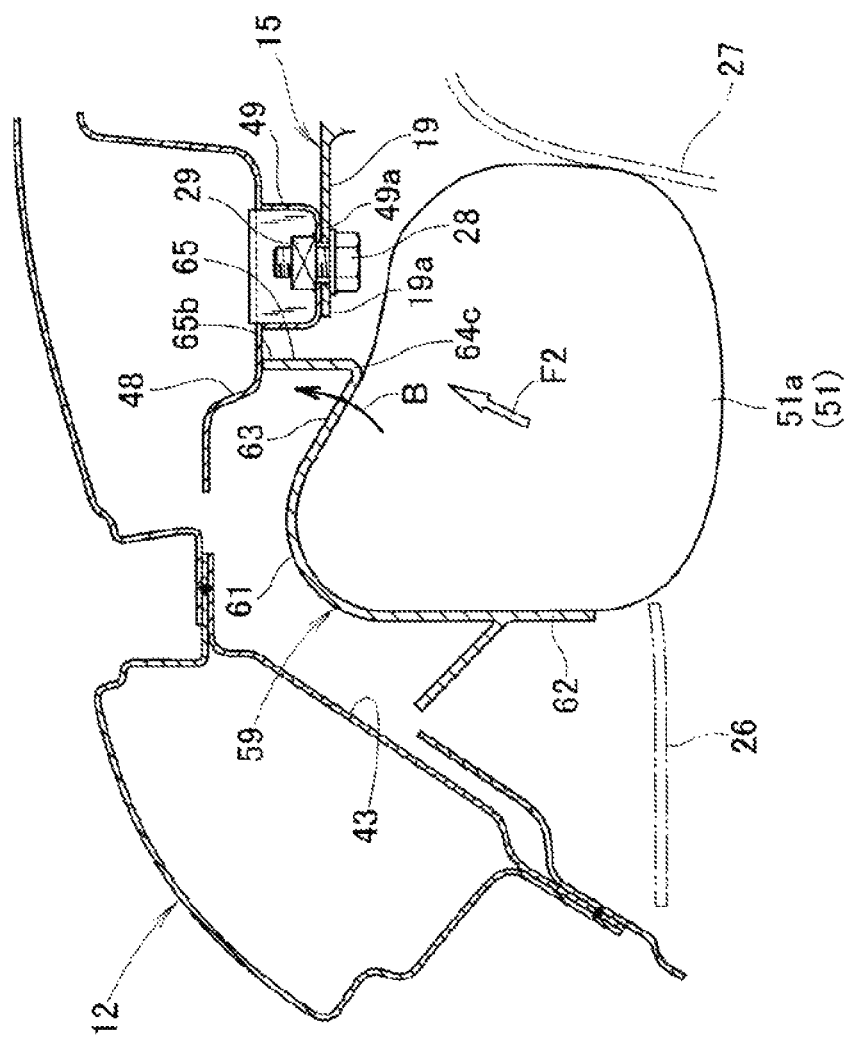
FIG. 8 is a view for explaining an example of deploying the bag body of a side curtain airbag according to the present invention.

Next, based on FIG. 8, a description is given of an example of deploying the bag body 51 of the side curtain airbag 20.

As illustrated in FIG. 8, along with the deployment of the bag body 51, the central part 51a of the deployed bag body 51 is received by the receiving part 63. A deployment force F2 of the bag body 51 acts on the receiving part 63, and thus the support part 61 of the central protector 59 (specifically a portion of the support part 61 close to the receiving part 63) and the receiving part 63 are deformed upward as indicated by the arrow D. Thereby, the upper end 65b of the contact end part 65 comes into contact with the reinforcement member 48, and the contact end part 65 is supported by the reinforcement member 48.

Here, the support part 61 and the lower part 62 are fastened to the inner panel 43 of the roof side rail 12 with the bolt and nut (i.e., the fastening member). In other words, the central protector 59 can be supported at the two points, i.e., the inner panel 43 and the reinforcement member 48 during deployment of the bag body 51. Thus, an impact force generated when the bag body 51 deploys can be supported favorably by the inner panel 43 and the reinforcement member 48 (that is, the vehicle body 10).

Thereby, the central protector 59 can be supported in a stable manner at a predetermined position. Accordingly, since the bag body 51 can be held stably by the central protector 59, the stability of the bag body 51 can be improved. In addition, by holding the bag body 51 stably, the bag body 51 can be deployed smoothly.

Here, in the state where the contact end part 65 is supported by the reinforcement member 48, the bottom part 64c of the curve part 64 is located below the mounting part 19 of the sunroof unit 15. Accordingly, since the central part 51a of the deployed bag body 51 is received by the receiving part 63 and the curve part 64, the central part 51a can be disposed below the mounting part 19 of the sunroof unit 15.

Thereby, it is possible to prevent the central part 51a of the deployed bag body 51 from being brought into contact with and damaged by an edge (corner part) 19a of the mounting part 19.

Note that the vehicle body equipped with an airbag system according to the present invention is not limited to the foregoing embodiment and can be changed, improved, etc. as appropriate.

For example, while the embodiment has been described with the sunroof unit 15 taken as an example of the body component, the body component is not limited thereto, and the body component may be another component such as a duct for a vehicle air conditioner.

Further, the shapes and configurations of the vehicle body, the roof side rail, the sunroof unit, the mounting part, the side curtain airbag, the inner panel, the reinforcement member, the bag body, the inflator, the central protector, the receiving part, the curve part, the contact end part, and the like illustrated in the above embodiment are not limited to the exemplified ones and can be changed as appropriate.

INDUSTRIAL APPLICABILITY

The present invention is suitable for use in automobiles including a vehicle body equipped with an airbag system in which a bag body of a side curtain airbag is mounted on a roof side rail and the like.

DESCRIPTION OF REFERENCE NUMERALS

10 VEHICLE BODY EQUIPPED WITH AIRBAG SYSTEM (VEHICLE BODY)
12 ROOF SIDE RAIL (SIDE PART OF VEHICLE BODY)
15 SUNROOF UNIT (BODY COMPONENT)
19 MOUNTING PART
20 SIDE CURTAIN AIRBAG (AIRBAG SYSTEM)
28, 29 BOLT, NUT (FASTENING MEMBER)
43 INNER PANEL (SIDE PANEL)
48 REINFORCEMENT MEMBER (UPPER PANEL)
51 BAG BODY
51a CENTRAL PART OF BAG BODY
52 INFLATOR
58 PROTECTOR
59 CENTRAL PROTECTOR (PROTECTOR)
63 RECEIVING PART
64 CURVE PART
65 CONTACT END PART (END PART)
F1, F2 DEPLOYMENT FORCE OF BAG BODY
L1 CLEARANCE
L2 GAP

The invention claimed is:

1. A vehicle body equipped with an airbag device, comprising:
   a side panel and an upper panel each disposed in a wall part of said vehicle body to which said airbag device is installed, said upper panel being disposed inside a roof of the vehicle body;
   a bag body that is disposed along said wall part of said vehicle body;
   an inflator that is configured to feed gas to said bag body and deploy said bag body with the gas thus fed; and
   a protector with a deformable body that holds said bag body so as to receive a deployment force of said bag body, the protector comprising a support part fastened to the side panel so as to support the said bag body and an edge part located on a vehicle inner side of the support part in a vehicle widthwise direction, the edge part facing upward and toward said upper panel and being movable toward said upper panel, wherein
   said protector is configured to leave a gap between the edge part thereof and said upper panel when installed to said wall part, and
   when said bag body is deployed, said protector is capable of deformation upon receiving the deployment force of said bag body such that said edge part moves toward said upper panel and becomes in contact with said upper panel, thereby causing said upper panel to support the protector along with said airbag body that is being deployed.

2. The vehicle body equipped with the airbag device according to claim 1, wherein said protector comprises:
   said edge part;

a receiving part that is provided outside said edge part in the vehicle widthwise direction and configured to hold said bag body when it is deployed; and a curve part that is formed between said receiving part and said edge part and connects said receiving part and said edge part to each other.

3. The vehicle body equipped with the airbag device according to claim 2, wherein said vehicle body includes a body component that is provided inside said airbag device in the vehicle widthwise direction, and said body component has a mounting part that is disposed inside said airbag device in the vehicle widthwise direction so as to be adjacent to said airbag device with a clearance therebetween and that is fastened to said vehicle body with a fastening member.

4. The vehicle body equipped with the airbag device according to claim 2, wherein said edge part extends upward from an inner side end of said curve part such that a deployment force of the bag body causes said edge part to move upward and toward the upper panel.

5. The vehicle body equipped with the airbag device according to claim 1, further comprising a roof panel of said vehicle body, wherein the upper panel is provided to the roof panel.

* * * * *